United States Patent [19]

Schoenig, Jr. et al.

[11] Patent Number: 4,620,100
[45] Date of Patent: Oct. 28, 1986

[54] AUTOMATED MONITORING OF FISSILE AND FERTILE MATERIALS IN LARGE WASTE CONTAINERS

[75] Inventors: Frederick C. Schoenig, Jr., Wilmington, N.C.; Sharon G. Glendinning, Palo Alto, Calif.; Timothy Schick, Wilmington, N.C.; Samuel Untermyer, II, Portola Valley, Calif.

[73] Assignee: General Electric Company, San Jose, Calif.

[21] Appl. No.: 526,578

[22] Filed: Aug. 26, 1983

[51] Int. Cl.$^4$ ............................................. G01F 23/00
[52] U.S. Cl. ................................. 250/358.1; 250/390
[58] Field of Search ............. 250/358.1, 359.1, 361 R, 250/365 R, 366, 367, 390, 392, 432 R, 433, 496; 376/153

[56] References Cited

U.S. PATENT DOCUMENTS

| | | | |
|---|---|---|---|
| 3,018,374 | 1/1962 | Pritchett | 250/362 |
| 4,229,654 | 10/1980 | Arya et al. | 250/358.1 |
| 4,291,227 | 9/1981 | Caldwell et al. | 250/390 C |

Primary Examiner—Janice A. Howell
Attorney, Agent, or Firm—I. J. James, Jr.; Raymond G. Simkins

[57] ABSTRACT

A system for determining the U-235 and U-238 content in a box of radioactive waste material. The system utilizes a passive arrangement which detects spontaneous gamma ray emission from the material in combination with an active arrangement including a neutron source for activating the material.

2 Claims, 6 Drawing Figures

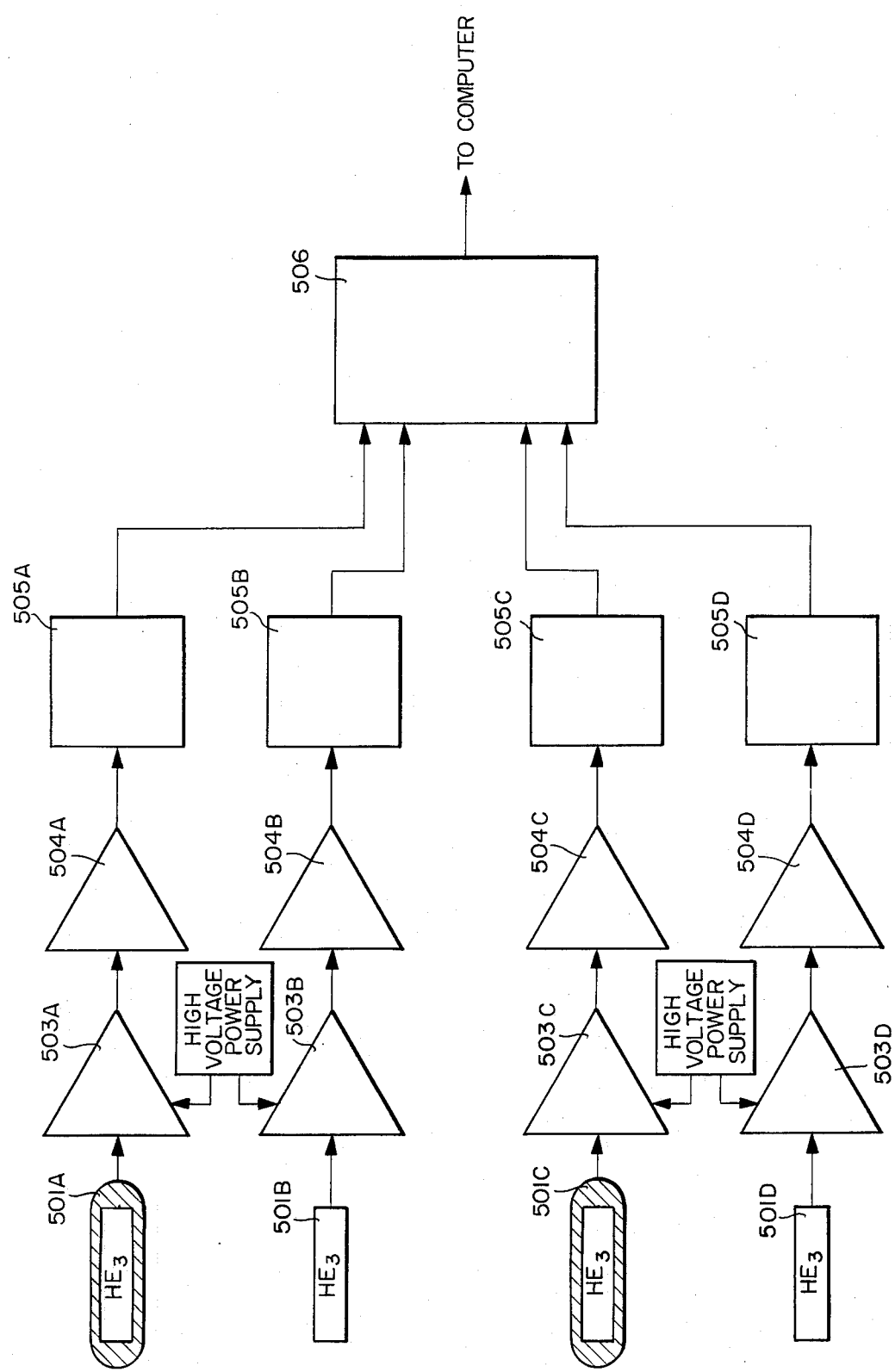

AUTOMATED MONITORING OF FISSILE AND FERTILE MATERIALS IN LARGE WASTE CONTAINERS

BACKGROUND AND SUMMARY

This invention relates to apparatus and methods for assaying and monitoring radioactive contaminated materials such as clothing, wipe rags, bags and the like which are of a combustible nature and had been accumulated in a large container (box) for purposes of processing to recover the fissile and/or fertile materials.

It has long been recognized in the nuclear field that control must be exercised over fissile and/or fertile materials. The control is essential to safeguard the health and well-being of individuals who work with nuclear materials as well as to prevent the acquisition of such materials by an individual or group of individuals who may be desirous of constructing nuclear devices and/or weapons. Control is also necessary because of the intrinsically high monetary value of this material. The apparatus hereinafter defined is generally directed to the materials of uranium 235 and uranium 238 although the same may be utilized with materials such as plutonium or the like.

In implementing the invention disclosed herein provision is first made for the deposition of the hereinbefore referred to materials in a container or box which may in one embodiment be approximately 4 feet in height, 4 feet in width and 4 feet in depth preferably constructed of combustible material such as wood or cardboard. The combustible box is delivered by means of a forklift truck or other conveyance to a first motorized conveyor by means of which it is moved into a monitor wherein measurements are made first in a passive mode (without an interrogation neutron source) and then in an active (with an interrogation neutron source) mode. Dependent upon such measurements the box is then moved out either onto a reject queue or a burn queue. The box or boxes on the burn queue are passed into an incinerator via the burn queue and the box and contents are then incinerated and the residue is passed out through the incinerator outlet to a collector can. The collector ash can and contents are then placed upon a queue and propelled on said queue to a further monitor station. The monitor station for large containers provides a means for measuring the uranimum content of both uranimum 235 and uranium 238 and of the combustible waste contained in the box. The heretofore measurements are made by detecting the neutrons and gamma rays from the uranimum both with and without a neutron interrogation source activity. Because of the importance of these measurements to the control of nuclear criticality the measurement of fissile and/or fertile content are both performed in two diverse measurements each of which is redundant.

DETAILED DESCRIPTION OF THE INVENTION

The incinerator utilized following assaying by the present invention is more fully disclosed in an application filed by Frederick C. Schoenig, Jr. and Leonard N. Grossman application Ser. No. 486,523 filed in the United States Patent Office on or about Apr. 19, 1983 now abandoned in favor of continuation application Ser. No. 677,374 filed Dec. 4, 1984, and assigned to the same assignee as the present application, and the same is incorporated herein by reference thereto.

It is an object of the present invention to directly obtain an estimate of uranium contents in a combustible waste box as well as the contents of non-combustible material in such box.

It is a further object of the invention to more accurately estimate the U-235 and U-238 contents of the combustible box by utilizing a redundant checking system.

It is also an object of the invention to obtain independent measurements of U-235 and U-238 waste for criticality control via diverse systems.

It is another object of the invention to utilize this automated system for the measuring of uranium waste to reduce the hazards of radiation for people handling radioactive materials.

Other objects and advantages of the invention will be apparent to those skilled in the art from a reading of the specification when taken with the drawings herein where:

Figure 3:
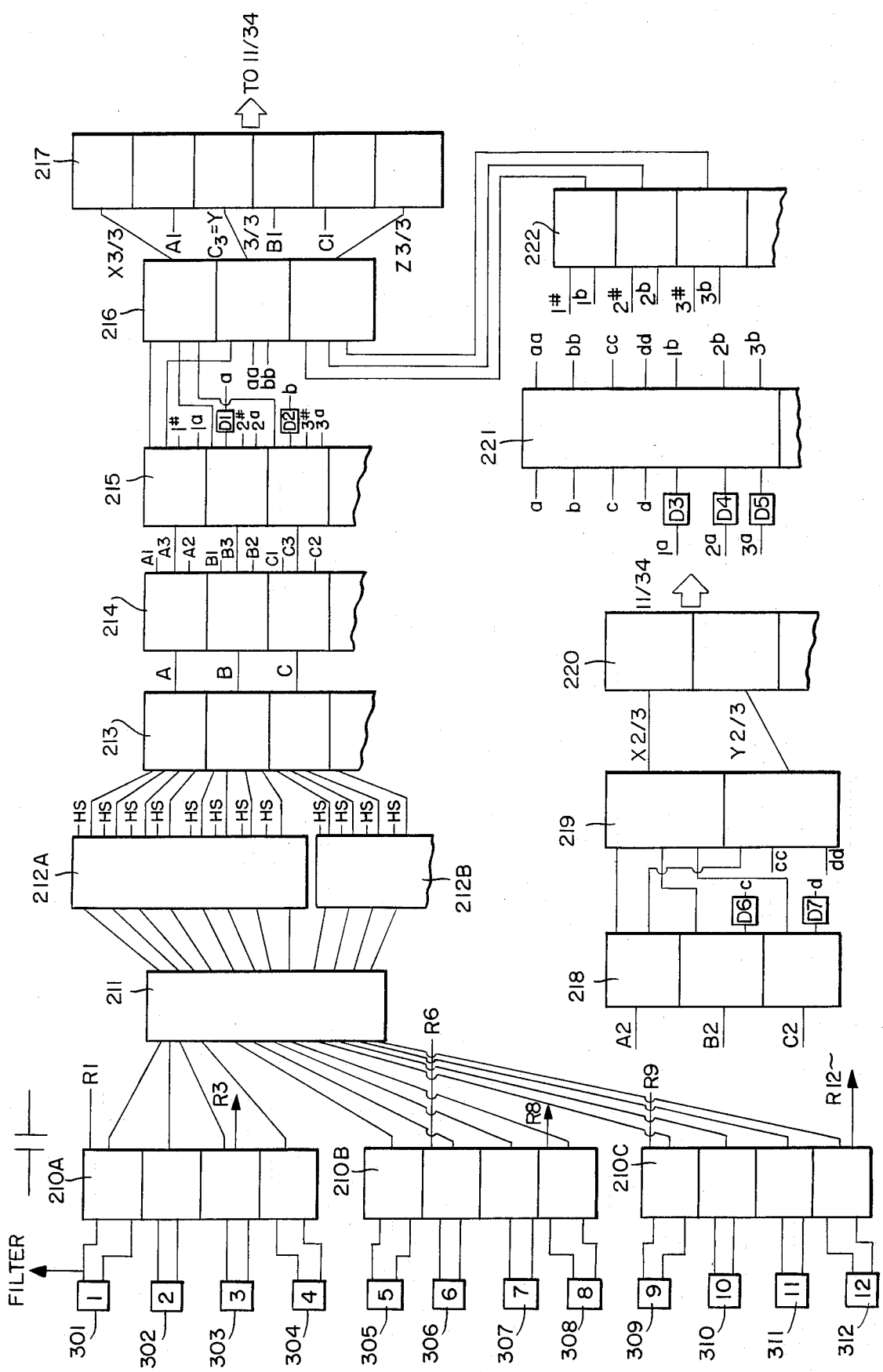
Figure 3A:
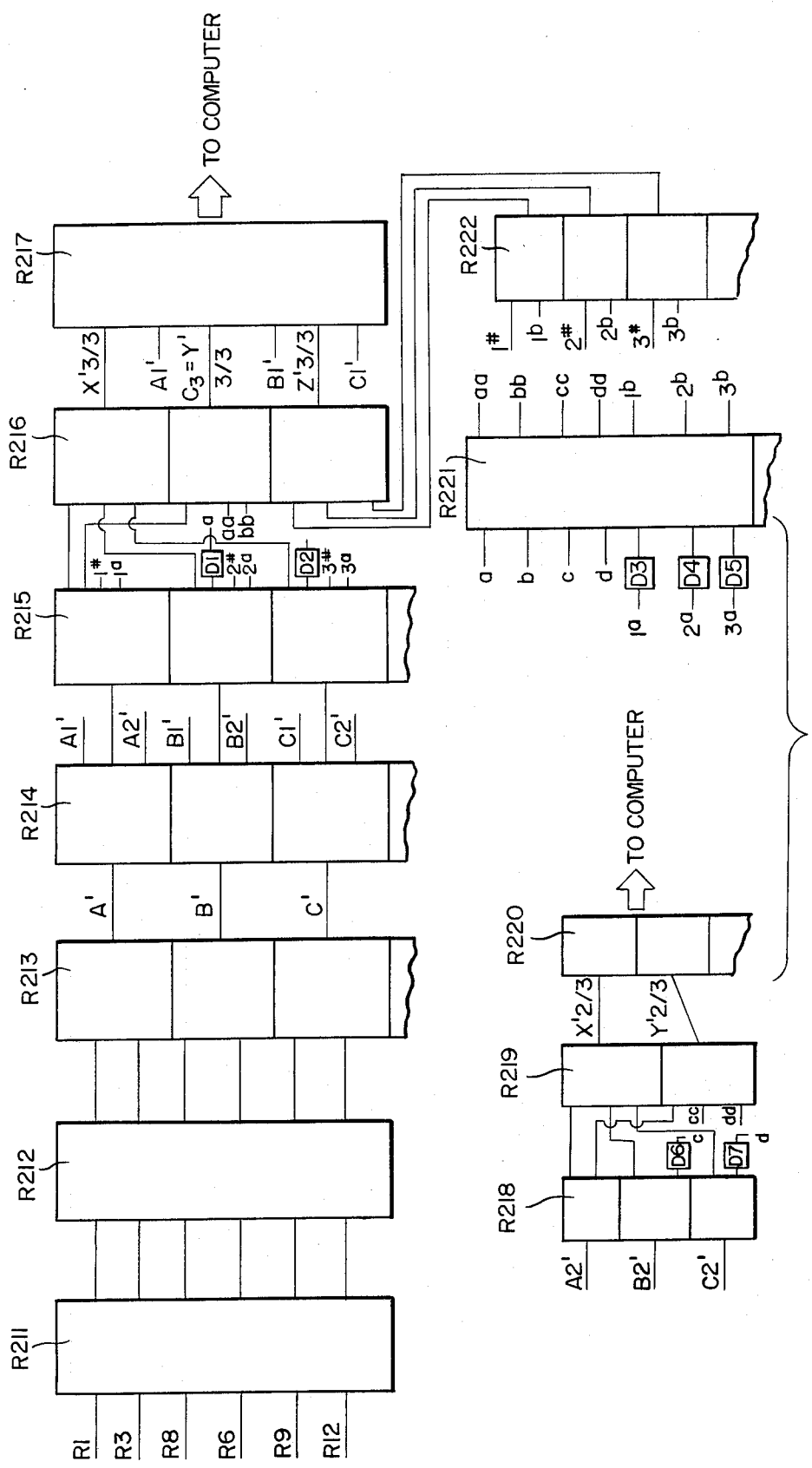

FIGS. 3 and 3A form a block diagram of the electronic circuitry utilized in practicing the invention and show the interface for a computer used with the invention and the common reference designations thereon indicate interconnections in the circuit.

Figure 4:
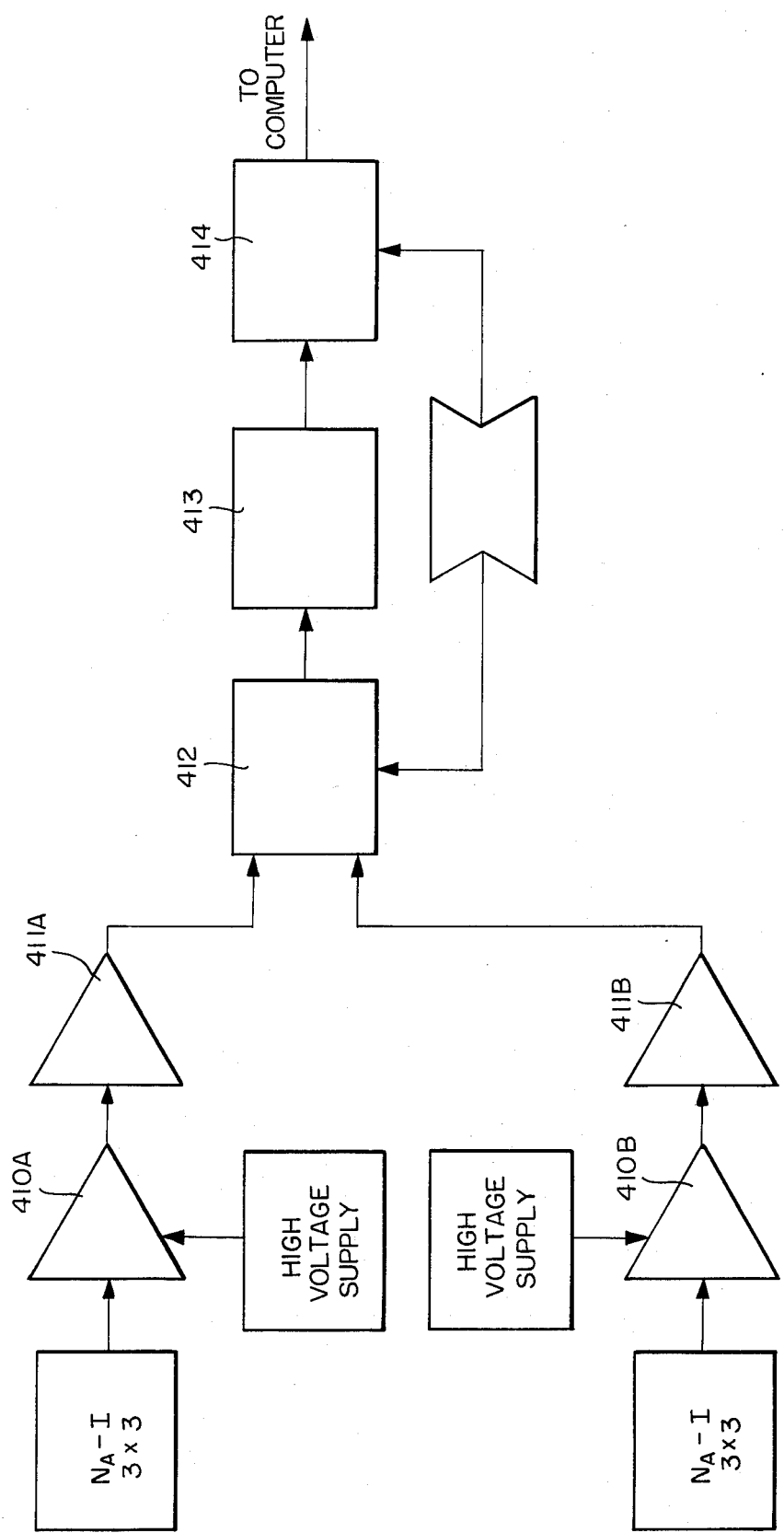

FIG. 4 is a block diagram of the electronic circuitry utilized in practicing the invention and showing the system when utilizing sodium iodide detectors in a redundant mode.

FIG. 5 is a block diagram of the electronic circuitry further utilized in practicing the invention and showing the system utilizing the four detectors in monitoring for non-combustible materials.

THE BOX MONITOR

Material Handling System

The purpose of the material handling system is to automatically convey a waste box from the outside of the incinerator within a building to the waste box monitor for measurement and to an incinerator for burning or to a reject queue if the wastebox fails to meet pre-established criteria.

Figure 1:
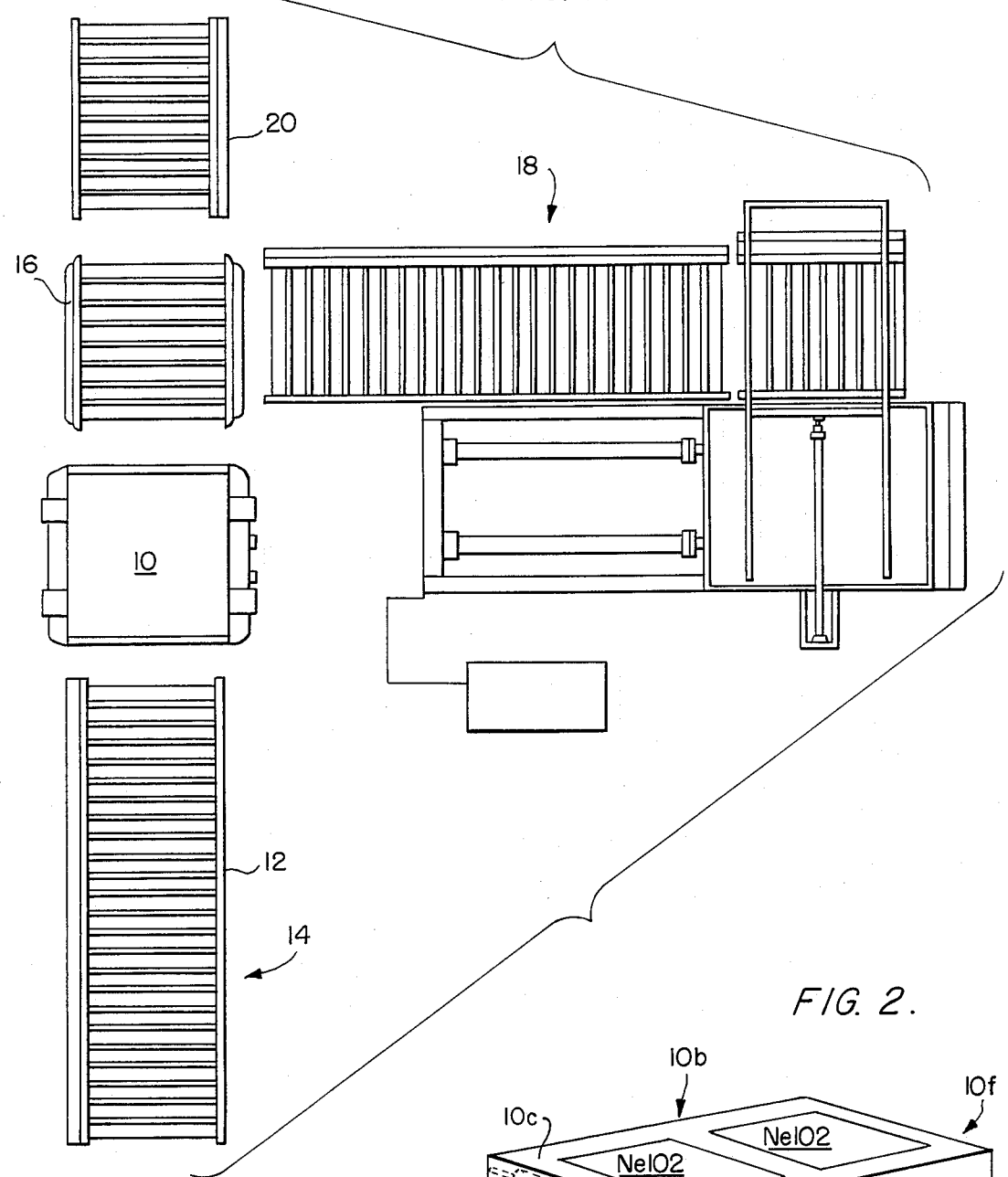
FIG. 1 is a view of a conveyor system utilized with the box monitor disclosed herein.

The material handling system, referring to FIG. 1, transports combustible boxes containing contaminated material to and from a monitor device henceforth called box monitor 10. Reference numeral 12 designates the input portion of the conveyor system which is shown as including power driven rollers 14 for automatically conveying boxes (not shown) of contaminated combustible waste containing fissile and/or fertile material to the box monitor. After the box containing the contaminated combustible waste material is assayed it is passed on to a further conveyor section 16 which section will be rotated under direction of a controlling computer such as Digital Equipment Corp. 11/34, to further feed the box to a conveyor portion 18 or to a conveyor portion 20. Conveyor portion 18 ultimately transports the box to an incinerator section, more fully disclosed in the application filed on or about Apr. 19, 1983, by Frederick C. Schoenig, Jr. and Leonard N. Grossman and herein before identified, upon the box having met certain prior qualifications. Upon the box having failed to meet the prior qualifications the box would be sent along conveyor 20 for repackaging.

Figure 2:
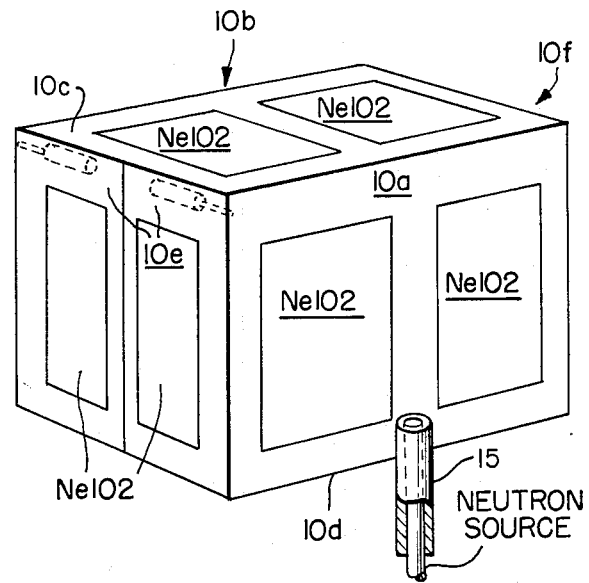
FIG. 2 is a view in projection of the box monitor.

A more detailed description of the box monitor 10 is made with reference to FIG. 2. The box monitor, which is an enclosure having side members 10a and 10b respectively, top member 10c and bottom member 10d and entry door 10e and exit door 10f, is suitably fashioned to receive within its interior the combustible boxes conveyed to it on the conveyer portions 14. The active box monitor is provided with two NE102 plastic scintillation detectors on each side, top and bottom, entry door and exit door. Although only the scintillation detectors (12) are shown positioned with respect to the top 10c, one side 10a and the entry door 10e the scintillation detectors are similarly positioned with respect to the bottom 10d, the backside 10b and the exit door 10f. The entry and exit door are opened and closed by use of air cylinders the doors being slidably mounted respective the box.

Since the light output of each NE102 plastic scintillation detectors is very low each scintillator has two photomultiplier tubes associated therewith. One photo multiplier tube is coupled to each end of a scintillation detector. Voltages required for the photo multiplier tubes are provided by a high voltage supply system which may be a LeCroy high voltage supply (Model HV54032A).

The box monitor herein described directly measures the U-235 and U-238 radioactivity of the materials contained in the box. In the course of the measurements, several systems are presently utilized according to the invention. The first system is a primary main system which utilizes twelve detectors formed around the box in a $4\pi$ shape configuration. The second system is a redundant primary system which consists of a subset of 6 of the aforementioned 12 detectors. A third system called the diverse system, utilizes two sodium iodide detectors, one placed above the box monitor and a second placed below the box monitor. A neutron source 15 which is utilized with the box monitor is movable with respect to the box monitor assembly and may be raised or lowered respective the sides of box monitor 10. The neutrons from the source cause the U235 to fission in proportion to the mass of U235. The gamma rays which are collected simultaneously in triplet by the NE102 plastic detectors are then counted as a measure of the U235 present. An additional system for detecting noncombustible materials in the box utilizes the energy spectrum sensitive sodium iodide neutron detectors on the top and bottom of the box monitor.

Primary Electronics System

The purpose of the primary electronics system is to collect 24 analog pulses from the 12 scintillator detectors and then convert them to fast negative, logic pulses for counting, reduce the number of pulses and perform preliminary processing of these signals. These pre-processed signals pass to a digital computer for final processing and evaluation of fissile and fertile contents in a waste box. The 12 NE102 scintillation detectors bearing reference numbers 301-312 (FIG. 3) provide 24 analog pulses, two signals from each scintillator for maximum detector efficiency. These 24 signals feed into three electronic combining circuits to reduce the number of analog pulses to 12 in number; circuits 210A, 210B, 210C are fan in/fan out summing units performing this combination LeCroy Model 428F units may be used for this purpose.

These 12 analog pulses are subsequently amplified by a gain-of-ten linear amplifier, unit 211 and are then passed to two updating energy discriminators, such as LeCroy, Model 623B units 212A and 212B, which discriminate with respect to voltage the 12 analog pulses and convert these discriminated analog pulses to fast negative, pulses to be used to determine the fissile and fertile material content of the waste box.

One set of the foregoing 12 negative, logic pulses pass to two 50 mHZ counters, which may be Kinetic Systems Model #3610 units (not shown in FIG. 1) for continuous monitoring of the 12 scintillator outputs. A second set of the 12 negative pulses pass to a fan in/fan out circuit 213 one type of which may be a LeCroy Model #428F. This unit combines the 12 negative pulses into three negative pulse lines A, B and C. The negative pulses are shape corrected to 25 nanosecond wide negative pulses by an updating discriminator unit 214, such as a LeCroy Model 623B. This unit outputs three sets of three negative pulses (set A1, B1, C1; set A2, B2, C2; set A3, B3, C3).

Set A1, B1, C1 pass to scaler unit 217 which counts the total number of negative pulses from A1, B1 and C1 and passes these total counts to a digital computer the Digital Equipment Corp. 11/34.

Set A2, B2, C2 passes to a fan in/fan out combining circuit 218 and these sets are combined to form three sets of two negative pulses which input to a dual 4-fold majority logic circuit 219 which may be a LeCroy Model 365AL.

Two of these pulses that output from the 218 fan in/fan out go through delay lines D6 and D7 and to up dating discriminator unit 221 and then to the dual 4-fold majority logic circuit 219. The logic circuit 219 accumulates total 2-of-3 coincidence events and accidental 2-of-3 coincidence events simultaneously.

The total 2-of-3 coincidence events $X_3^2$ and accidental coincidence events $Y_3^2$ pass to a scaler circuit 220 which accumulates the total 2-of-3 counts for each of the two lines and passes this total count to the DEC-11/34 digital computer for final processing.

Under neutron interrogation of the waste box, that is, in the active mode of operation with the neutron source positioned adjacent the box monitor, the set of signals A3, B3, C3 provide measurement of fissile material. These signals are pre-processed via a linear fan in/fan out counting circuit 215 which may be a LeCroy 428F which provide 3 sets of four outputs of which five pass to an updating discriminator through various delay lines 221. This discriminator finalizes the pulse shapes and pulse widths. In addition three pair of outputs pass to a linear fan in/fan out counting circuit 222 which combines these three pairs into three individual outputs which are routed to a 4-fold logic unit 216. One type of unit 216 may be a LeCroy-Model 465. This electronic unit provides three preprocessed outputs; X3/3, the total three-fold coincidence count rate, Y3/3, the pure chance or accidental three-fold count rate, Z3/3, and the combined two true plus chance coincidence count rate. Signals X3/3, Y3/3, Z3/3 input to scaler circuit 217 which may be a Kinetic System 3610 which accumulates the total counts and passes these total counts to the DEC 11/34 digital computer for final analysis of fissile material in the waste box.

Referring back to units 210A, 210B, 210C these combining electronic modules also provide a predetermined subset of six analog signals R1, R3, R6, R8, R9, R12 from the original twelve analog signals. This subset is directed to the redundant electronics circuit (FIG. 3A) which is used in identically the same manner as the above described primary electronics system. Other than the reduction of the number of analog nuclear pulse inputs from 12 to six the redundant system preprocesses and outputs signals to the DEC-11/34 digital computer in the same manner as above. The equivalent circuits are numbered with equivalent numbers and are preceded by the letter "R" to indicate the redundant subset electronics package shown in FIG. 3A.

The Diverse Electronics System

The purpose of the diverse electronics system (FIG. 4) is to provide a completely separate independent measurement of fissile and fertile material content in a combustible waste container.

The diverse system consists of a main and a redundant section. Two energy discriminating detectors in this case NaI(Tl) are located one at the top of the waste box monitor and the other at the bottom of the waste box monitor. Each detector collects nuclear particles (gamma rays) emitted from fissile and fertile material, converts these to preamplified voltage signals via circuits such as Canberra 2007P preamplifiers units 410A and 410B which passes these preamplified voltage signals to amplifiers 411A and 411B. These later amplifiers serve to reshape the original preamplified pulse in order to permit an energy discriminated input to the remaining diverse electronics system.

These signals are routed through a mixer/router circuit 412 which keeps track of each of the two inputs and on to a 100 mHz analog-to-digital converter circuit 413. The circuit 413 samples the analog pulses for energy processing by a multichannel analyzer circuit 414 which may be in the form of a Canberra Series 40 MCA. The multichannel analyzer separates the input pulses with respect to energy level thereby providing system measurement of fissile and fertile material in a waste box when in the passive mode of operation. The diverse main system consists of the average output of the plurality of energy discriminating detectors. The redundant system is formed by the output of one of the two energy discriminating detectors.

In addition, under neutron interrogation of a waste box (in the active mode of operation), the diverse system is capable of determining the presence of several chemical elements which could potentially interfere with the fissile/fertile material determination. It also provides a positive check on the position of the interrogating neutron source.

A separate neutron detector system provides a direct, redundant measure of noncombustible contents in a waste box (FIG. 5).

Two sets of neutron detectors, one set positioned at the top of the waste box monitor the other set at the bottom of the waste box monitor form a main and redundant measurement of non-combustible contents in the waste box via a series of neutron energy spectrum intensity measurements. The analog voltage pulses formed in each of these detectors originates from neutron interaction within these detectors during active, neutron interrogation of the waste box. The pulses output from these detectors pass to four individual preamplifiers 503A, 503B, 503C, 503D which may be of a type known as Tenelec TC-175 models. The pre-amplified pulses pass to four indivual amplifiers units 504 A-D which amplifiy and pulse shape the input signals. The four amplified, pulses pass to four individual signal channel analyzers 505 A-D and then to a scaler 506 for final accumulation of counts. The scaler may be a Kinetic System, Model 3610 unit. The accumulated counts pass to the DEC-11/34 digital computer where they are used to analyze the amount of non-combustible material in the waste box.

The Primary System

The preprocessed electronics signals described previously are input to a DEC-11/34 digital computer from the primary measurement system via the previously identified scalers.

In the passive mode (no neutron interrogation sources) pulses resulting from outputs $A_1$, $B_1$ and $C_1$ are collected by the digital computer and summed together. The summed counts are background corrected, corrected for matrix content and this corrected count is used to assess the amount of fertile material contained in the waste box. In the same fashion, the redundant system, providing outputs $A_1'$, $B_1'$, $C_1'$ from the previously described subset of scintillator detectors, are background corrected, corrected for matrix content and this corrected count is used to assess the amount of fertile material in a waste box. The results from the main and redundant systems provide comparable measurements used for statistical evaluation.

In the active mode (under neutron interrogation) the three-fold coincidence counts are employed to assess the amount of fissile material in a waste box. The total gross counts from the main and redundant systems are corrected for background and corrected for matrix content. The resulting corrected three-fold count is used to determine the amount of fissile material in the waste box.

Diverse System

After the multichannel analyzer has finished collecting spectral data the digital computer accesses the spectra, stores them on disks; and analyzes the spectral peaks utilizing appropriate algorithms and estimates the fissile/fertile material content.

All fissile/fertile measurements are calibrated against standards of known composition that are of a manufacture to cover the range of both fissile/fertile content and waste material composition.

What is claimed is:

1. Apparatus for determining the amount of U-235 and U-238 which is contaminating combustible waste material contained in a combustible box, comprising: a box monitor structure for receiving said box and having side members, a top member, a bottom member; a first plurality of radiation detectors mounted on said side, top and bottom members of said monitor structure for producing first signals in response to passive radiation from radioactive material in said box; circuit means for receiving and processing said first signals including energy discrimination, signal counting and signal coincidence analysis to provide first processed signals indicating the U-238 content of said box; a second plurality of radiation detectors or energy discriminating type positioned adjacent said monitor structure for producing second signals in response to passive gamma radiation from radioactive material in said box; circuit means for receiving and processing said second signals including energy analysis of said signals to provide second processed signals; a neutron source selectively movable to a position adjacent said monitor structure for directing neutrons into said box therein for activation of the radioactive material in said box, said first plurality of radiation detectors providing third signals in response to radiation induced in said radioactive material in said box by neutrons from said neutron source; circuit means for receiving and processing said third signals including energy discrimination and signal coincidence analysis to provide third processed signals, indicative of U-235 content of said box; a third plurality of radiation detectors responsive to neutrons positioned adjacent said monitor structure for producing fourth signals in response to neutrons resulting from fission of U-235 in said box induced by irradiation of said U-235 by the neutrons from said neutron source; circuit means for receiving and processing said fourth signals including counting said signals to provide fourth processed signals; and means for analyzing and for comparing said first, second, third and fourth processed signals against signals obtained from standards of known composition for providing an indication of the U-235 and U-238 content of said box.

2. The apparatus of claim 1 including means for weighing said box.

* * * * *